United States Patent
Schoneboom

(10) Patent No.: US 10,300,767 B2
(45) Date of Patent: May 28, 2019

(54) HEAT EXCHANGER AND RADIATOR-CONDENSER UNIT

(71) Applicant: DENSO International America, Inc., Southfield, MI (US)

(72) Inventor: Sean Schoneboom, Bronson, MI (US)

(73) Assignee: DENSO International America, Inc., Southfield, MI (US)

(*) Notice: Subject to any disclaimer, the term of this patent is extended or adjusted under 35 U.S.C. 154(b) by 197 days.

(21) Appl. No.: 15/343,636

(22) Filed: Nov. 4, 2016

(65) Prior Publication Data

US 2018/0126823 A1    May 10, 2018

(51) Int. Cl.
| | |
|---|---|
| *F28F 9/00* | (2006.01) |
| *B60H 1/32* | (2006.01) |
| *F28F 9/02* | (2006.01) |
| *B60K 11/00* | (2006.01) |
| *B60K 11/04* | (2006.01) |
| *B60H 1/00* | (2006.01) |

(52) U.S. Cl.
CPC ........... *B60H 1/3227* (2013.01); *B60K 11/00* (2013.01); *B60K 11/04* (2013.01); *F28F 9/0246* (2013.01); *B60H 1/00571* (2013.01); *F28F 2255/143* (2013.01)

(58) Field of Classification Search
CPC ...... F28F 9/0246; F28F 9/0248; F28F 9/0251; F28F 9/025; F28F 9/002; F28F 2255/1433; B60H 1/3227; B60H 1/00571
See application file for complete search history.

(56) References Cited

U.S. PATENT DOCUMENTS

| | | | | |
|---|---|---|---|---|
| 5,467,611 | A * | 11/1995 | Cummings | ........ B60H 1/00571 251/151 |
| 6,609,558 | B1 | 8/2003 | Charbonnelle | |
| 2007/0163760 | A1 * | 7/2007 | Seno | ........ F25B 39/04 165/132 |
| 2009/0229266 | A1 | 9/2009 | Taylor | |
| 2013/0145783 | A1 | 6/2013 | Hong et al. | |

* cited by examiner

*Primary Examiner* — Eric S Ruppert

(57) ABSTRACT

The present disclosure provides a heat exchanger for a vehicle. The heat exchanger includes a relay block and a base member. The relay block has a first passage and a second passage. The relay block includes a first connecting surface and a second connecting surface. The base member is formed of plastic. The first connecting surface is configured to be connected to a first connector that is in fluid communication with a first in-vehicle component. The second connecting surface is configured to be connected to a second connector that is in fluid communication with a second in-vehicle component. Heat medium flows into the first in-vehicle component through the first passage and the heat medium flows into the second in-vehicle component through the second passage. The relay block is integrally formed with the base member by molding.

6 Claims, 4 Drawing Sheets

HEAT EXCHANGER AND RADIATOR-CONDENSER UNIT

TECHNICAL FIELD

The present disclosure relates to a heat exchanger and a radiator-condenser unit.

BACKGROUND

Typically, a vehicle has an engine compartment for housing an internal combustion engine on a front-end part of the vehicle, and heat exchangers such as a condenser and a radiator are installed inside the engine compartment. Such a condenser is in fluid communication with another in-vehicle component, such as a compressor, an extension valve, to form a refrigerant circuit. The radiator is in fluid communication with the engine and forms a coolant circuit.

The condenser is typically connected to the compressor and the extension valve through tubes. However, due to recent downsizing trends in vehicles, the housing capacity of the engine component tends to be restricted, and therefore there may be difficulty in connecting such tubes between the condenser and the compressor/the expansion valve in such a limited space.

SUMMARY

This section provides a general summary of the disclosure, and is not a comprehensive disclosure of its full scope or all of its features.

The present disclosure of a first aspect provides a heat exchanger for a vehicle. The heat exchanger includes a relay block and a base member. The relay block has a first passage and a second passage. The relay block includes a first connecting surface and a second connecting surface. The base member is formed of plastic. The first connecting surface is configured to be connected to a first connector that is in fluid communication with a first in-vehicle component. The second connecting surface is configured to be connected to a second connector that is in fluid communication with a second in-vehicle component. Heat medium flows into the first in-vehicle component through the first passage and the heat medium flows into the second in-vehicle component through the second passage. The relay block is integrally formed with the base member by molding.

The present disclosure of a second aspect provides a radiator-condenser unit for a vehicle. The radiator-condenser unit includes a radiator, a condenser, and a relay block. The radiator has a tank that is formed of a plastic. The relay block has a first passage and a second passage. The relay bock includes a first connecting surface and a second connecting surface. The first connecting surface is configured to be connected to a first connector that is in fluid communication with the condenser. The second connecting surface is configured to be connected to a second connector that is in fluid communication with an in-vehicle component. Heat medium flows into the condenser through the first passage and the heat medium flows into the in-vehicle component through the second passage. The relay block is integrally formed with the tank by injecting-molding.

The present disclosure of a third aspect provides a heat exchanger for a vehicle. The heat exchanger includes a first relay block, a second relay block, and a base member. The first relay block has a first passage and includes a first inlet connecting surface and a second inlet connecting surface. The second relay block has a second passage and includes a first outlet connecting surface and a second outlet connecting surface. The base member is formed of a plastic. The first inlet connecting surface is configured to be connected to a first inlet connector that is in fluid communication with a first in-vehicle component. The second inlet connecting surface is configured to be connected to a second inlet connector that is in fluid communication with a second in-vehicle component. The first outlet connecting surface is configured to be connected to a first outlet connector that is in fluid communication with the first in-vehicle component. The second outlet connecting surface is configured to be connected to a second outlet connector that is in fluid communication with the second in-vehicle component. Heat medium flows into the first in-vehicle component through the first passage and the heat medium flows into the second in-vehicle component through the second passage. The first relay block and the second relay block are integrally formed with the base member by molding while being separate from each other.

The present disclosure of a fourth aspect provides a radiator-condenser unit for a vehicle. The radiator-condenser unit includes a radiator, a condenser, a first relay block, and a second relay block. The radiator has a tank that is formed of a plastic. The first relay block has a first passage and includes a first inlet connecting surface and a second inlet connecting surface. The second relay block has a second passage includes a first outlet connecting surface and a second outlet connecting surface. The first inlet connecting surface is configured to be connected to a first inlet connector that is in fluid communication with the condenser. The second inlet connecting surface is configured to be connected to a second inlet connector that is in fluid communication with an in-vehicle component. The first outlet connecting surface is configured to be connected to a first outlet connector that is in fluid communication with the condenser. The second outlet connecting surface is configured to be connected to a second outlet connector that is in fluid communication with the in-vehicle component. Heat medium flows into the condenser through the first passage and the heat medium flows into the in-vehicle component through the second passage. The first relay block and the second relay block are integrally formed with the base member by molding while being separate from each other.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
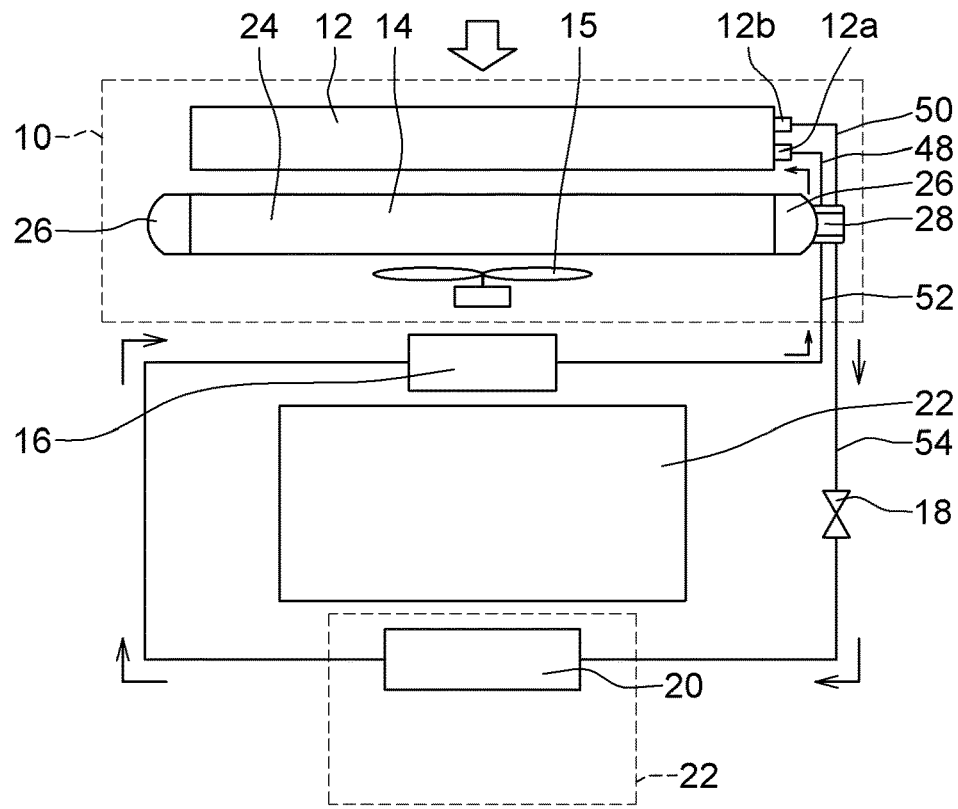
FIG. 1 is a schematic diagram depicting components of a vehicle air conditioning and cooling system.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As follows, a first embodiment of the present disclosure will be described with reference to FIGS. 1 to 3. With initial reference to FIG. 1, a block diagram of a portion of a vehicle heating, ventilating and air-conditioning ("HVAC") system for a vehicle (not shown) is depicted. The HVAC system is installed in an engine compartment defined in a front side of the vehicle, for example. The HVAC system generally includes a radiator-condenser unit 10, a compressor 16, an expansion valve 18, an evaporator 20, and so on.

The radiator-condenser unit 10 is disposed at a front side of the engine compartment and an outside air drawn into the engine compartment passes through the radiator-condenser unit 10. An internal combustion engine 22 for the vehicle is installed in the engine compartment behind the radiator-condenser unit 10 (i.e., the downstream side of the radiator-condenser unit 10). The compressor 16 is disposed between the radiator-condenser unit 10 and the engine 22, and the expansion valve 18 is arranged at one side of the engine 22. In the present embodiment, the compressor 16 and the expansion valve 18 can be included in an in-vehicle component or can serve as a second in-vehicle component. The evaporator 20 is housed in a HVAC casing 22 that is positioned at a rear side of the engine compartment behind the engine 22.

The radiator-condenser unit 10 is generally formed of a condenser 12 and a radiator (heat exchanger) 14 that are integrally formed into one component. The condenser 12 can serve as a first in-vehicle component in this embodiment. The radiator-condenser unit 10 also includes a fan 15. More specifically, the condenser 12 is located at the most front side of the radiator-condenser unit 10, and the radiator 14 and the fan 15 are arranged in this order along the flow direction of the outside air that is drawn into the engine compartment. As shown in FIG. 1, the radiator 14 is positioned away from the condenser 12 with a specified distance.

The condenser 12 forms, together with the compressor 16, the expansion valve 18, and the evaporator 20, an air-cooling system through which refrigerant (heat medium) circulates. The condenser 12 includes a core formed of a pipe, and the refrigerant flows through the core from an inlet 12a to an outlet 12b. In the present embodiment, the inlet 12a and the outlet 12b of the condenser 12 are positioned at one side of the core (the right side in FIG. 1). The inlet 12a of the condenser 12 is in fluid communication with the compressor 16, whereas the outlet 12b of the condenser 12 is in fluid communication with the expansion valve 18, as will be described below.

The radiator 14 includes a radiator core 24, two tanks 26, and a relay block 28. The radiator core 24 has a rectangular shape and the two tanks 26 are disposed on both sides of the radiator core 24. The radiator 14 is fluidly connected to the engine 22, and coolant circulates between the radiator 14 and the engine 22. The radiator 14 cools the coolant flowing through the radiator core 24 by exchanging heat between the coolant and the outside air passing through the radiator core 24. Each of the two tanks 26 is made of a plastic by molding, more specifically, by injection-molding. The relay block 28 is disposed in one of the two tanks 26 (the right tank in FIG. 1). The tank 26 equipped with the relay block 28 serves as a base member in the present embodiment.

The relay block 28 is made of metal, such as aluminum, and is integrally formed with the tank 26 by the injection-molding. That is, the relay block 28 and the tank 26 are formed at the same time by the injection-molding. As shown in FIG. 2, the relay block 28 has a first connecting surface 30 and a second connecting surface 32 that are opposite to each other. The first connecting surface 30 faces toward the condenser 12 and the second connecting surface 32 faces away from the condenser 12.

Figure 2:
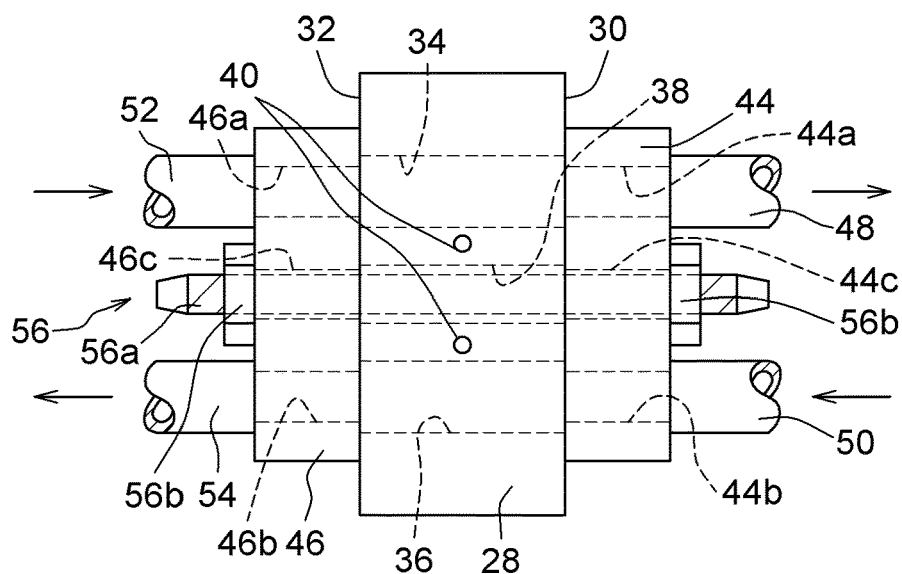
FIG. 2 is a diagram illustrating a relay block and first and second connectors that are fixed to the relay block by a fixing member.
Figure 3:
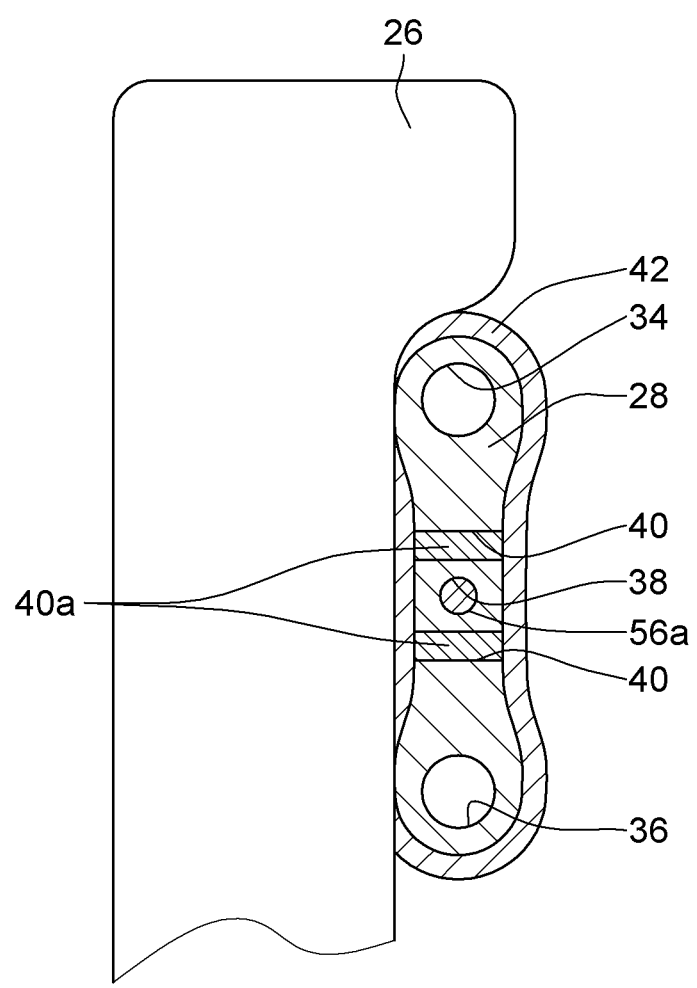
FIG. 3 is a cross-sectional view of the relay block.

As shown in FIGS. 2 and 3, the relay block 28 has a first passage 34 and a second passage 36. Both the first and second passages 34, 36 extend in parallel to each other to pass through the relay block 28 between the first connecting surface 30 and the second connecting surface 32. The relay block 28 further defines a through hole 38 that extends in parallel to both the first and second passages 34, 36 to pass through the relay block 28 between the first connecting surface 30 and the second connecting surface 32. The through hole 38 extends between the first passage 34 and the second passage 36.

In the present embodiment, two holes 40 are formed in the relay block 28. Each of the two holes 40 passes through the relay block 28 in a direction perpendicular to the extending direction of the through hole 38.

As shown in FIG. 3, almost the entire surface of the relay block 28 except the first and second connecting surfaces 30, 32 is covered with a plastic coating 42 that is formed during the injection-molding. The plastic coating 42 is integrally formed with the tank 26, thereby fixing firmly the relay block 28 to the tank 26. Furthermore, each of the two holes 40 is filed with a plastic 40a formed during the injection-molding. The plastic 40a in each of the holes 40 is integrally connected to the plastic coating 42. As a result, strength of the relay block 28 is enhanced. It should be noted FIG. 2 illustrates the relay block 28 without the plastic coating 42.

As shown in FIG. 2, the first connecting surface 30 is configured to be detachably connected to a first connector 44 and the second connecting surface 32 is configured to be detachably connected to a second connector 46. The first connector 44 is in fluid communication with the condenser 12 through a first inlet tube 48 and a first outlet tube 50. More specifically, the first connector 44 defines a first inlet hole 44a and a first outlet hole 44b. The first inlet hole 44a is in fluid communication with the inlet 12a of the condenser 12 through the first inlet tube 48 and the first outlet hole 44b is in fluid communication with the outlet 12b of the condenser 12 through the first outlet tube 50. The first connector 44 further defines therein a first connector hole 44c.

The second connector 46 is in fluid communication with the compressor 16 and the expansion valve 18 through a second inlet tube 52 and a second outlet tube 54, respectively. More specifically, the second connector 46 defines a second inlet hole 46a and a second outlet hole 46b. The second inlet hole 46a is in fluid communication with the compressor 16 through the second inlet tube 52. The compressor 16 is in fluid communication with an outlet of the evaporator 20. The second outlet hole 46b is in fluid communication with the expansion valve 18 through the second outlet tube 54. The expansion valve 18 is in fluid communication with an inlet of the evaporator 20. The second connector 46 further defines therein a second connector hole 46c.

The first connector 44 and the second connector 46 are connected to the relay block 28 by a fastening member 56. In the present embodiment, the fastening member 56 includes a bolt 56a and two nuts 56b. In a state where the first connector 44 is in contact with the first connecting surface 30 and the second connector 46 is in contact with the second connecting surface 32, the bolt 56a is inserted into the first connector hole 44c, the through hole 38, and the second connector hole 46c. Then, the first connector 44, the relay block 28, and the second connector 46 are tighten by the two nuts 56b each of which is fastened onto a respective one of both sides of the bolt 56a. Thus, the first connector 44, the relay block 28, and the second connector 46 are clamped between the two nuts 56b.

The first inlet hole 44a is in fluid communication with the first passage 34 when the first connector 44 is connected to the first connecting surface 30. The first outlet hole 44b is in fluid communication with the second passage 36 when the first connector 44 is connected to the first connecting surface 30. The second inlet hole 46a is in fluid communication with the first passage 34 when the second connector 46 is connected to the second connecting surface 32. The second outlet hole 46b is in fluid communication with the second passage 36 when the second connector 46 is connected to the second connecting surface 32.

A refrigerant that was cooled and condensed in the condenser 12 flows out of the condenser 12 from the outlet 12b and flows through the first outlet tube 50. Then, the refrigerant flows through the first outlet hole 44b, the second passage 36, and the second outlet hole 46b, and flows into the expansion valve 18 through the second outlet tube 54. In the expansion valve 18, the refrigerant is decompressed, and then the refrigerant flows into the evaporator 20. Further, the refrigerant flows out of the evaporator 20 through the outlet and flows into the compressor 16. In the compressor 16, the refrigerant is compressed and then flows out of the compressor 16 through the second inlet tube 52. Then, the refrigerant passes through the second inlet hole 46a, the first passage 34, and the first inlet hole 44a, and flows into the condenser 12 through the first inlet tube 48.

As described above, the relay block 28 is integrally formed with the tank 26 by the injection-molding. Therefore, the relay block 28 is firmly fixed to the tank 26 without an additional fixing member such as brackets. Fluid communication between the relay block 28 and the condenser 12 is attained by connecting the first connector 44 to the first connecting surface 30 of the relay block 28. Similarly, fluid communication between the relay block 28 and the compressor 16 and the expansion valve 18 is attained by connecting the second connector 46 to the second connecting surface 32 of the relay block 28. Therefore, refrigerant circuit through the condenser 12, the expansion valve 18, the evaporator 20, and the compressor 16 can be easily established by connecting the first and second connectors 44, 46 to the relay block 28.

Second Embodiment

Next, the second embodiment will be described below with reference to FIGS. 4 and 5. In the first embodiment, the relay block 28 is formed as one component having the first and second passages 34, 36. In the second embodiment, the radiator 14 includes a first relay block 60 and a second relay block 62 as shown in FIG. 5.

The first relay block 60 is integrally formed with the tank 26 by injection-molding. The first relay block 28 has the first passage 34 and includes a first inlet connecting surface 64 and a second inlet connecting surface 66. Almost the entire surface of the first relay block 60 except the first and second inlet connecting surfaces 64, 66 is covered with the plastic coating 42 formed during the injection-molding. It should be noted that FIG. 4 illustrates the first relay block 60 without the plastic coating 42. The first inlet connecting surface 64 and a second inlet connecting surface 66 are opposite to each other. The first passage 34 passes through the first relay block 60 between the first and second inlet connecting surfaces 64, 66.

The first relay block 60 further has a first through hole 60a that passes through the first relay block 60 between the first and second inlet connecting surfaces 64, 66. The first through hole 60a is parallel to the first passage 34. The first relay block 60 further has a hole 40 filled with a plastic 40a that is formed during the injection-molding. The plastic 40a is integrally connected to the plastic coating 42 formed on the first relay block 60.

The second relay block 62 is integrally formed with the tank 26 by injection-molding. As shown in FIG. 5, the second relay block 62 is separate away from the first relay block 60 with a specified distance. The second relay block 62 has the second passage 36 and includes a first outlet connecting surface 68 and a second outlet connecting surface 70.

Almost the entire surface of the second relay block 62 except the first and second outlet connecting surfaces 68, 70 is covered with the plastic coating 42 formed during the injection-molding. It should be noted that FIG. 4 illustrates the second relay block 62 without the plastic coating 42. The first outlet connecting surface 68 and the second outlet connecting surface 70 are opposite to each other. The second passage 36 passes through the second relay block 62 between the first and second outlet connecting surfaces 68, 70.

The second relay block 62 further has a second through hole 62a that passes through the second relay block 62 between the first and second outlet connecting surfaces 68, 70. The second through hole 62a is parallel to the second passage 36. The second relay block 62 further has a hole 40 filled with a plastic 40a that is formed during the injection-molding. The plastic 40a is integrally connected to the plastic coating 42 formed on the second relay block 62.

Figure 4:
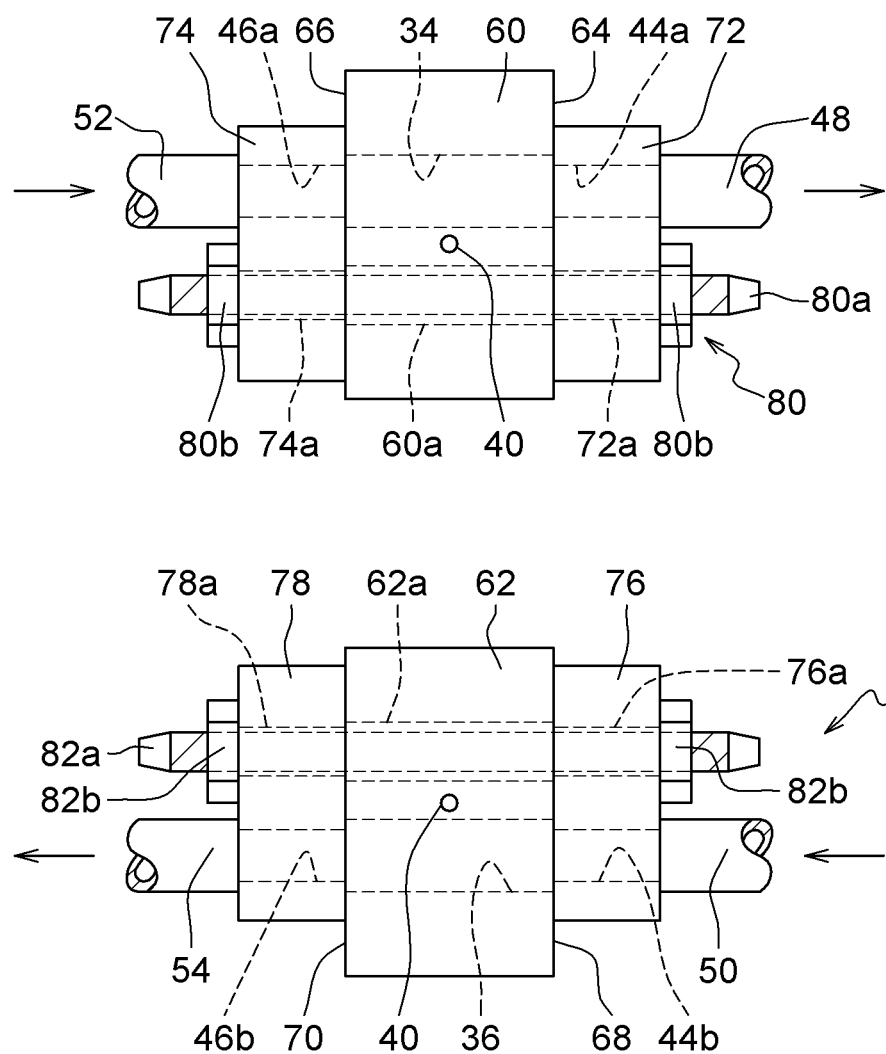
FIG. 4 is a diagram illustrating a first relay block and first and second inlet connectors that are fixed to the first relay block by a first fixing member and a second relay block and first and second outlet connectors that are fixed to the second relay block by a second fixing member.
Figure 5:
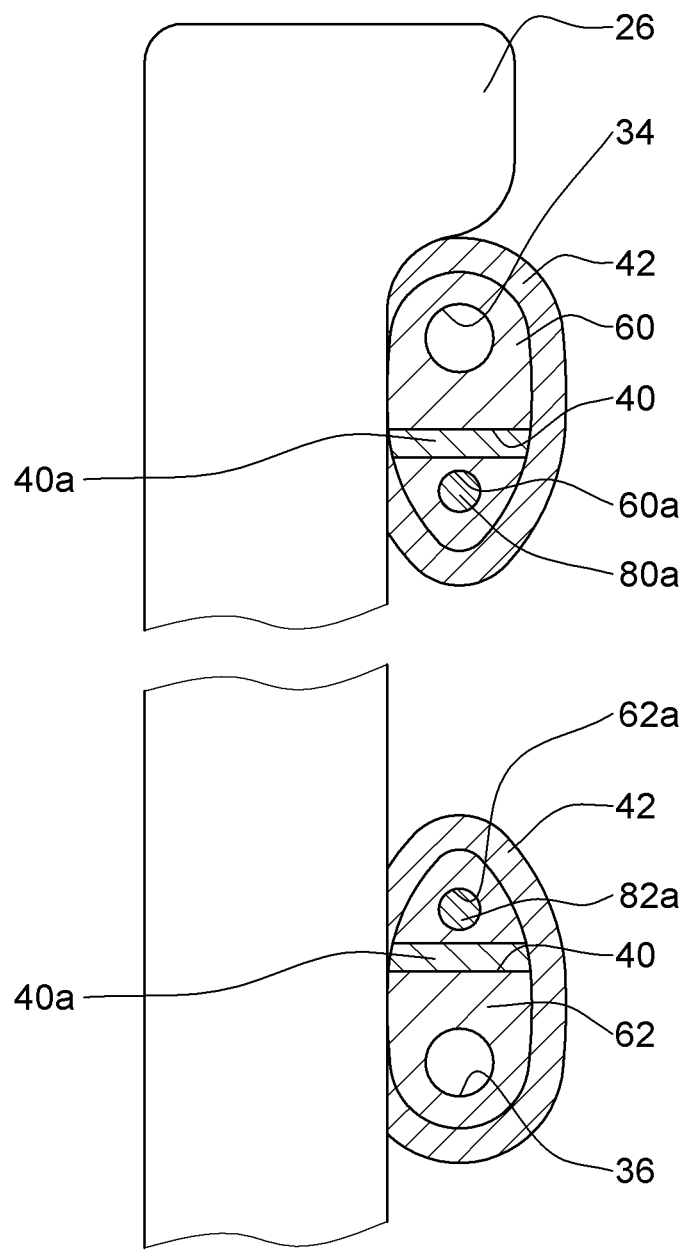
FIG. 5 is a cross-sectional view of the first and second relay blocks.

As shown in FIG. 4, the first inlet connecting surface 64 is configured to be detachably connected to a first inlet connector 72 and the second inlet connecting surface 66 is configured to be detachably connected to a second inlet connector 74. The first inlet connector 72 is in fluid communication with the condenser 12 through the first inlet tube 48. More specifically, the first inlet connector 72 defines the first inlet hole 44a. The first inlet hole 44a is in fluid communication with the inlet 12a of the condenser 12 through the first inlet tube 48. The first inlet connector 72 further defines a first inlet connector hole 72a.

The second inlet connector 74 is in fluid communication with the compressor 16 through the second inlet tube 52. More specifically, the second inlet connector 74 defines the second inlet hole 46a. The second inlet hole 46a is in fluid communication with the compressor 16 through the second inlet tube 52. The second inlet connector 74 further defines a second inlet connector hole 74a.

The first outlet connecting surface 68 is configured to be detachably connected to a first outlet connector 76 and the second outlet connecting surface 70 is configured to be detachably connected to a second outlet connector 78. The first outlet connector 76 is in fluid communication with the condenser 12 through the first outlet tube 50. More specifically, the first outlet connector 76 defines the first outlet hole 44b. The first outlet hole 44b is in fluid communication with the outlet 12b of the condenser 12 through the first outlet tube 50. The first outlet connector 76 further defines a first outlet connector hole 76a.

The second outlet connector 78 is in fluid communication with the expansion valve 18 through the second outlet tube 54. More specifically, the second outlet connector 78 defines the second outlet hole 46b. The second outlet hole 46b is in fluid communication with the expansion valve 18 through the second outlet tube 54. The second outlet connector 78 further defines a second outlet connector hole 78a.

The first inlet connector 72 and the second inlet connector 74 are connected to the first relay block 60 by a first fastening member 80. In the present embodiment, the first fastening member 80 includes a first bolt 80a and two first nuts 80b. In a state where the first inlet connector 72 is in contact with the first inlet connecting surface 64 and the second inlet connector 74 is in contact with the second inlet connecting surface 66, the first bolt 80a is inserted into the first inlet connector hole 72a, the first through hole 60a, and the second inlet connector hole 74a. Then, the first inlet connector 72, the first relay block 60, and the second inlet connector 74 are tighten by the two first nuts 80b each of which is fastened onto a respective one of both sides of the first bolt 80a. Thus, the first inlet connector 72, the first relay block 60, and the second inlet connector 74 are clamped between the two first nuts 80b.

The first inlet hole 44a is in fluid communication with the first passage 34 when the first inlet connector 72 is connected to the first inlet connecting surface 64. The second inlet hole 46a is in fluid communication with the first passage 34 when the second inlet connector 74 is connected to the second inlet connecting surface 66.

The first outlet connector 76 and the second outlet connector 78 are connected to the second relay block 62 by a second fastening member 82. In the present embodiment, the second fastening member 82 includes a second bolt 82a and two second nuts 82b. In a state where the first outlet connector 76 is in contact with the first outlet connecting surface 68 and the second outlet connector 78 is in contact with the second outlet connecting surface 70, the second bolt 82a is inserted into the first outlet connector hole 76a, the second through hole 62a, and the second outlet connector hole 78a. Then, the first outlet connector 76, the second relay block 62, and the second outlet connector 78 are tighten by the two second nuts 82b each of which is fastened onto a respective one of both sides of the second bolt 82a. Thus, the first outlet connector 76, the second relay block 62, and the second outlet connector 78 are clamped between the two first nuts 82b.

The first outlet hole 44b is in fluid communication with the second passage 36 when the first outlet connector 76 is connected to the first outlet connecting surface 68. The second outlet hole 46b is in fluid communication with the second passage 36 when the second outlet connector 78 is connected to the second outlet connecting surface 70.

Therefore, a refrigerant from the condenser 12 flows into the expansion valve 18 through the first outlet connector 76, the second relay block 60, and the second outlet connector 78, and then, the refrigerant flows into the evaporator 20. The refrigerant from the evaporator 20 flows into the compressor 16, and then flows into the condenser 12 through the second inlet connector 74, the second relay block 62, and the first inlet connector 72.

As described above, the first relay block 60 and the second relay block 62 are integrally formed with the tank 26 by the injection-molding. Therefore, the first and second relay blocks 60, 62 are firmly fixed to the tank 26 without an additional fixing member such as brackets. Fluid communication between the first relay block 60 and the condenser 12 is attained by connecting the first inlet connector 72 to the first inlet connecting surface 64 of the first relay block 60. Similarly, fluid communication between the first relay block 60 and the compressor 16 is attained by connecting the second inlet connector 74 to the second inlet connecting surface 66 of the first relay block 60. Furthermore, fluid communication between the second relay block 62 and the condenser 12 is attained by connecting the first outlet connector 76 to the first outlet connecting surface 68 of the second relay block 62. Similarly, fluid communication between the second relay block 62 and the expansion valve 18 is attained by connecting the second outlet connector 78 to the second outlet connecting surface 70 of the second relay block 62. Therefore, refrigerant circuit through the condenser 12, the expansion valve 18, the evaporator 20, and the compressor 16 can be easily established by connecting the first and second inlet connectors 72, 74 to the first relay block 60 and by connecting the first and second outlet connectors 76, 78 to the second relay block 62.

In the first embodiments, the relay block 28 is disposed in the tank 26 of the radiator 14. However, the relay block 28 may be disposed in other heat exchangers, such as a condenser or an evaporator. Furthermore, the shapes of the relay block 28, the first relay block 60, and the second relay block 62 may be not necessarily limited to those described in the above embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A radiator-condenser unit for a vehicle, the radiator-condenser unit comprising:
    a radiator having a tank that is formed of a plastic;
    a condenser; and
    a relay block having a first passage and a second passage, the relay bock including a first connecting surface and a second connecting surface, wherein
    the first connecting surface is configured to be connected to a first connector that is in fluid communication with the condenser,
    the second connecting surface is configured to be connected to a second connector that is in fluid communication with an in-vehicle component, and
    heat medium flows into the condenser through the first passage and the heat medium flows into the in-vehicle component through the second passage, wherein
    the relay block is integrally formed with the tank by injection-molding.

2. The radiator-condenser unit according to claim 1, wherein
    the relay block is formed of metal.

3. The radiator-condenser unit according to claim 2, wherein
    the relay block has a hole filled with the plastic formed during the injection-molding.

4. The radiator-condenser unit according to claim 1, wherein
    the relay block, the first connector, and the second connector are connected to each other by a fastening member.

5. The radiator-condenser unit according to claim 4, wherein
    the fastening member includes a bolt and two nuts,
    the relay block has a through hole passing through between the first and second connecting surfaces,
    the first connector has a first connector hole,
    the second connector has a second connector hole, and
    the bolt is inserted into the through hole, the first connector hole, and the second connector hole,
    each of the two nuts is fastened onto a respective one of two sides of the bolt such that the first connector, the relay block, and the second connector are clamped between the two nuts.

6. The radiator-condenser unit according to claim 1, wherein the in-vehicle component includes a compressor and an extension valve.

* * * * *